United States Patent [19]
Stewart et al.

[11] Patent Number: 5,145,191
[45] Date of Patent: Sep. 8, 1992

[54] HEAT-RESISTANT PROTECTIVE COVER FOR A DRIVE AXLE JOINT SEAL

[75] Inventors: Todd B. Stewart, Troy; Daniel G. Yurgaites, Auburn, both of Mich.

[73] Assignee: International Sales & Engineering, Inc., Southfield, Mich.

[21] Appl. No.: 683,239

[22] Filed: Apr. 10, 1991

[51] Int. Cl.⁵ ............................ F16J 15/52; F16D 3/84
[52] U.S. Cl. .................... 277/212 FB; 74/18; 277/227; 277/230; 403/51; 464/175
[58] Field of Search ............... 277/212 FB, 229, 230, 277/227; 403/50, 51; 138/124, 123, 125, 126; 74/18.1, 18.2, 18; 464/175, 174, 173

[56] References Cited

U.S. PATENT DOCUMENTS

| | | |
|---|---|---|
| 830,203 | 9/1906 | Bogart . |
| 1,885,121 | 11/1932 | Loweke ............... 74/18.2 X |
| 1,922,431 | 8/1933 | Geyer . |
| 1,982,445 | 11/1934 | Miquelon . |
| 2,025,635 | 12/1935 | Bishoff ............... 403/50 X |
| 2,085,284 | 6/1937 | Wollner . |
| 2,134,358 | 10/1938 | Crossland . |
| 2,378,046 | 6/1945 | Stergis . |
| 2,431,300 | 11/1947 | Quinn . |
| 3,032,812 | 5/1962 | Van Riper .............. 74/18.2 X |
| 3,211,019 | 10/1965 | Roach et al. ............ 464/173 X |
| 3,381,987 | 5/1968 | Husen . |
| 3,954,027 | 5/1976 | Söderberg et al. . |
| 4,813,913 | 3/1989 | Belter ................... 464/175 |
| 4,836,080 | 6/1989 | Kite, III et al. .......... 138/123 X |
| 5,006,376 | 4/1991 | Arima et al. ............ 277/212 FB |

FOREIGN PATENT DOCUMENTS

| | | |
|---|---|---|
| 18238 | 7/1935 | Australia . |
| 2591301 | 6/1987 | France ................. 464/175 |
| 171124 | 10/1982 | Japan .................. 464/175 |
| 261719 | 11/1987 | Japan . |
| 625099 | 6/1949 | United Kingdom . |
| 1587400 | 4/1981 | United Kingdom . |

*Primary Examiner*—Allan N. Shoap
*Attorney, Agent, or Firm*—Basile and Hanlon

[57] ABSTRACT

A drive axle joint seal sock for extending the operation of the joint seal and protecting the joint seal against high heat conditions. The sock comprises an elongate cylindrical housing having an aperture at each end and formed of a heat-resistant material. Clamping structure, such as adjustable clamping rings, extend about each aperture and clamp the sock about the drive axle shaft and the joint, respectively. The sock housing comprises an expanded central area of uniform profile to facilitate movement of the joint seal within the sock. The sock encloses the joint seal and protects the seal against exposure to heat from the engine, exhaust system or atmosphere.

7 Claims, 3 Drawing Sheets

HEAT-RESISTANT PROTECTIVE COVER FOR A DRIVE AXLE JOINT SEAL

BACKGROUND OF THE INVENTION

I. Field of the Invention

The present invention relates to drive axle joint seals. More particularly, the present invention relates to a cover for extending the operation of a drive axle joint seal.

II. Description of the Relevant Art

Vehicle drive axles are completely flexible assemblies consisting of an inner joint and an outer joint connected by an axle shaft. The inner joint is completely flexible and has the capability of in and out movement. The outer joint is also flexible, but cannot move in and out.

Inner and outer drive axle joints are generally covered by a bellows-like seal for protecting the axle joint from atmospheric conditions and aiding in keeping the joint lubricated during movement of the joint relative to the drive axle shaft. The bellows-like seal, generally referred to as a "boot," surrounds the joint and is sealed at either end by sealing means, such as ring clamps about the axle shaft at one end and the joint on the other end. The bellows allow free movement of the joint in and out, as well as rotationally, and flexing angularly.

The seal is normally formed of a silicone, neoprene rubber or thermoplastic material. Although such material is flexible and contains sealing characteristics, the seal is more apt to wear out from exposure to heat and other atmospheric conditions. A disadvantage of the seal is that replacement of a broken seal due to excessive heat breaking down the seal material requires disassembly of the drive axle and joint assembly. This can be time-consuming and very costly.

SUMMARY OF THE INVENTION

The present invention provides a heat-resistant protective cover for the drive axle joint seal which extends and enhances the range of operation of the seal.

The protective cover or "sock" is comprised of heat-resistant material, such as polytetrafluoroethylene (P.T.F.E.), plastic material, nylon fiber or a polyamide fiber. Such fibers are known by their trade names, Teflon, Kevlar, and Nomex, manufactured by DuPont. The heat-resistant material may be fabricated by weaving, knitting, braiding or layering a heat-resistant material stated above or combining, by co-weaving, several of the materials stated above to increase the resistivity of the material.

The heat-resistant cover is manufactured in the form of a sock for enclosing a drive axle joint seal and comprises a housing having an expanded central area of uniform profile. The housing may extend loosely about the joint seal if the heat-resistant material is fabricated from a dense fabric which tends to hold its shape. The expanded central area of the preformed sock allows the joint and joint seal to rotate freely about its central axis.

Tapered ends extend from the central area of the housing and have an opening at each end for seating the joint seal within. If the sock is fabricated without a seam or semiseamless, such as by knitting or weaving, then the sock must be preassembled with the drive axle shaft and joint in an assembly line setting. Aftermarket use will require the disassembly and re-assembly of the shaft.

A heat-resistant split sock may also be fabricated to enclose the joint axle seal. In this embodiment, the sock comprises an elongate housing substantially rectangular in shape. The housing is wrapped about the joint seal and clamped in place about the drive axle shaft and joint by clamping means, such as clamping rings. The split sock provides a heat-resistant cover that is more readily removable and replaceable after assembly of the drive axle shaft and joint.

An advantage of the heat-resistant sock is that it extends the range of operation of the joint seal by enhancing the heat-resistivity of the joint seal during operation. Different heat-resistant materials may be used to fabricate the sock for different conditions, such as heat resistance from an exhaust system, a turbo system, a vehicle engine or the atmosphere.

A further advantage of the split sock is the ability to remove and replace the sock when heat exposure to the joint seal changes according to a change in the condition surrounding the joint seal area.

BRIEF DESCRIPTION OF THE DRAWINGS

Other advantages and features of the present invention will become more apparent from the following detailed description when read in conjunction with the accompanying drawing. in which like reference characters refer to like parts throughout the views, and in which.

DESCRIPTION OF THE PREFERRED EMBODIMENTS

Figures 1, 2:
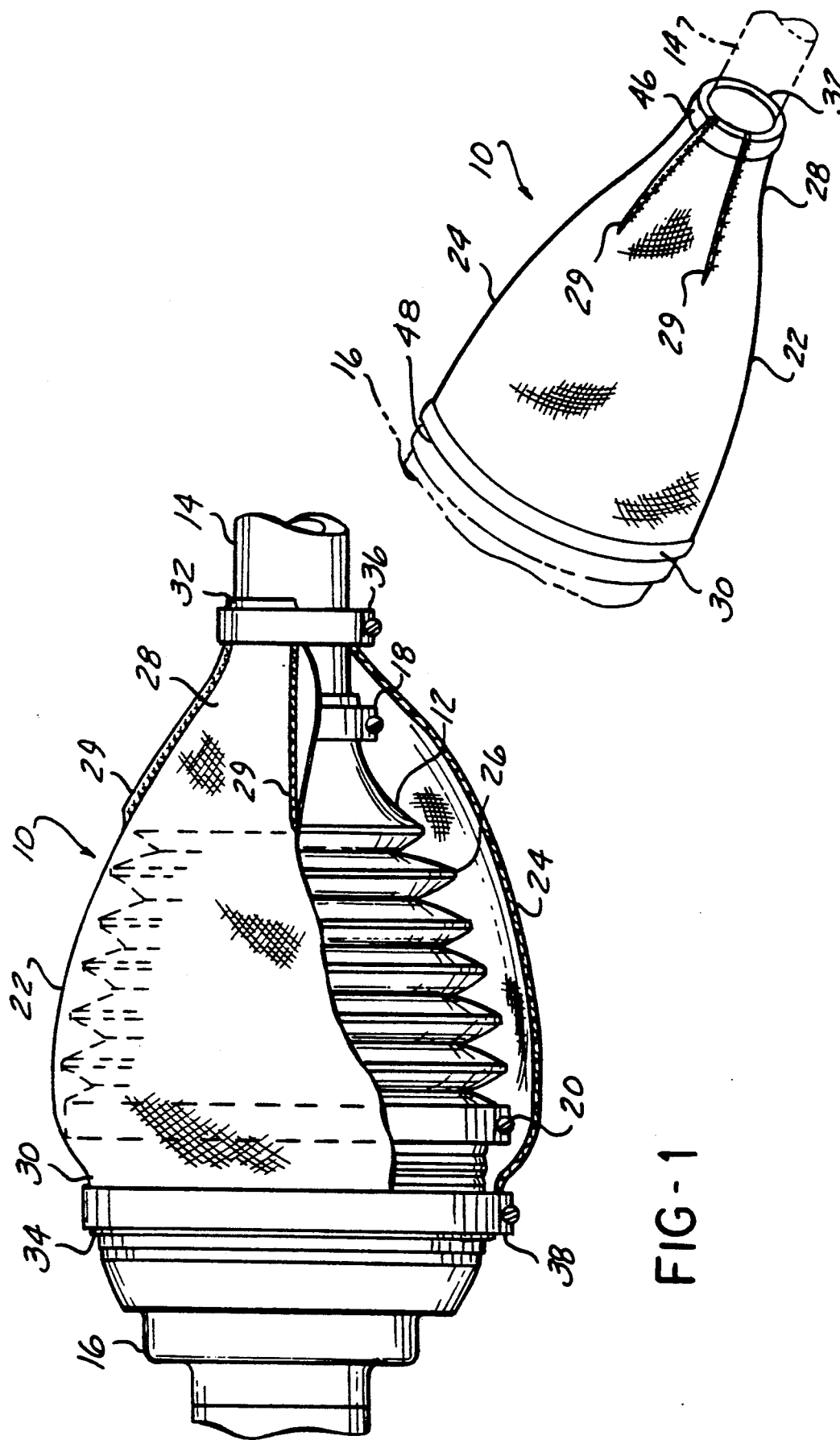
FIG. 1 is a cut-away side view of a drive axle joint including a preferred embodiment of the present invention.
FIG. 2 is a perspective view illustrating a first embodiment of the present invention.

With reference first to FIG. 1, a first preferred embodiment of a sock 10 of the present invention is there shown in a partially cut-away view.

A joint seal 12 extends about an inboard or outboard joint between the drive axle shaft 14 and joint 16. Joint seal 12 is clamped in position by clamping means 18, 20 about drive axle shaft 14 and joint 16, respectively. Joint seal 12 is usually formed of a material such as silicone, neoprene rubber or thermoplastic which aids in creating a seal about the clamping areas. Joint seal 12 protects the joint area by enclosing the joint and ensuring that the lubricating material contained therein will continuously lubricate the joint 16 during operation.

Sock 10 is comprised of a housing 22 extending around the joint seal 12. The housing 22 comprises an expanded central area 24 for loosely fitting about the tapered bellows area 26 of the joint seal 12. Tapered ends 28, 30 extend from central area 24 and have corresponding openings 32, 34 for clamping the sock 10 about the joint seal 12.

Clamping means 36, 38, such as ring clamps or other releasable clamping means well known in the art, are used to clamp tapered ends 28, 30 about drive axle shaft 14 and joint 16, respectively.

Figure 4:
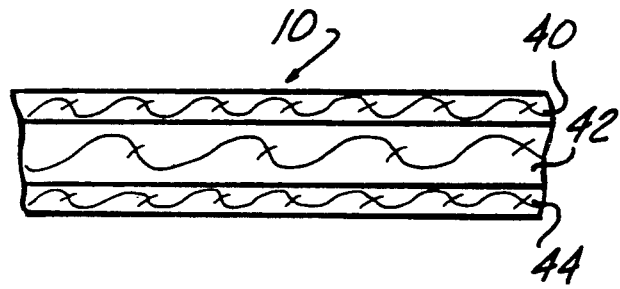
FIG. 4 is a cross-sectional view showing a preferred method of fabrication of the present invention.

With reference now to FIG. 4, a preferred method of fabricating a heat-resistant sock from heat-resistant material is there shown. Specifically, outer layer 40 may be formed of an insulating, protecting surface material, such as Kevlar, manufactured by DuPont, for reflecting heat away from the joint seal 12. Central layer 42 may preferably be comprised of a nylon fiber such as Nomex, manufactured by DuPont, which is specially fabricated to withstand exposure to 500° F. Inner layer 44, exposed to joint seal 12, is preferably formed of a polytetrafluoroethylene (P.T.F.E.) plastic material, such as Teflon, manufactured by DuPont, which also has good resistance to high temperatures, while simultaneously aiding in keeping the area between the joint seal 12, and the sock 10 lubricated.

Other preferable means of fabricating a heat-resistant sock is by knitting, weaving, or braiding one of the above-stated materials into a sock or interweaving any of a multiplicity of heat-resistant material, including polyamide fiber, such as Kevlar, manufactured by DuPont, and having great strength characteristics, with any of the above-stated materials to increase the heat resistivity of the sock material.

Materials, such as neoprene or polyurethane, may also be interwoven into or coated onto the heat-resistant material to aid in repelling water subjected to the joint seal by the atmosphere. Further, the use of a thermoplastic material or any elastomer may aid in keeping the heat-resistant material flexible.

With reference now to FIG. 2, a first preferred embodiment of a heat-resistant sock 10 is there shown. In this preferred embodiment, the heat-resistant sock 10 is fabricated by a dense heat-resistant material into the preformed shape shown in FIG. 2. The density of the heat-resistant material aids the sock 10 in maintaining its preformed shape. This preformed shape may be accomplished by knitting, braiding, or weaving a substantially rectangular shaped sock 10. The sock 10 is then cut in a mold to the preformed shape and placed on a mandrel to be blocked. Blocking of the preformed socks prevents the sock from shrinking after assembly about the joint seal 12.

The first preferred embodiment is semi-seamless, that is the sock 10 is formed of a unitary construction having short overlapping seams 29 about its exterior profile. Therefore, sock 10 must be preassembled with the drive axle shaft 14, joint 16 and joint seal 12 in an assembly line setting. Sock 10 may also be provided with preformed pockets 46, 48 (FIG. 2) for supporting clamping means 36, 38 within. These pockets are formed to support such well known clamping means as adjustable clamping rings shown in FIG. 1.

Figure 3:
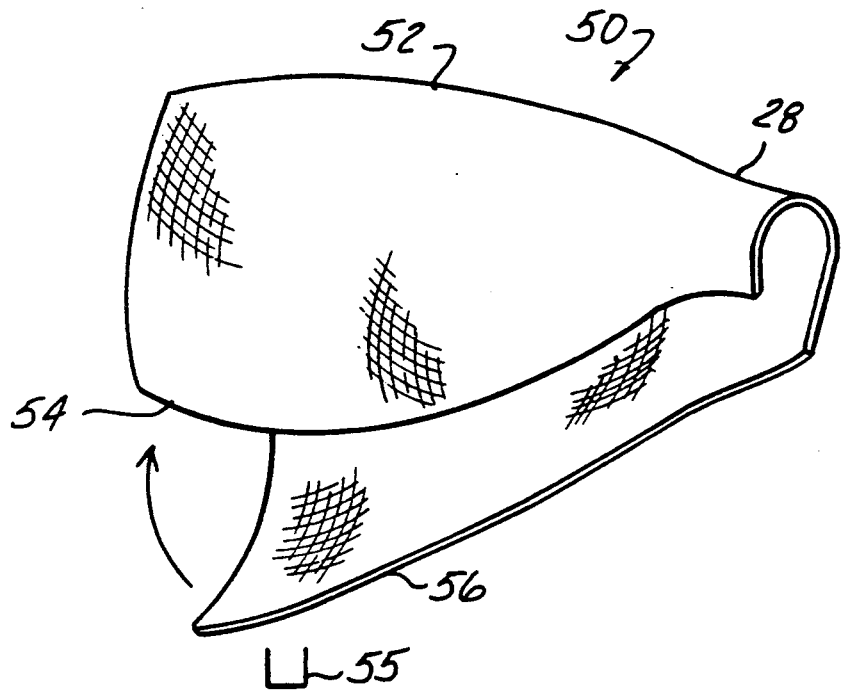
FIG. 3 is a perspective view illustrating a second embodiment of the present invention.

With reference now to FIG. 3, a second preferred embodiment of a heat-resistant sock 50 is there shown. The second preferred embodiment comprises a split sock 50 having a housing 52 which is rectangular in shape in an open configuration. Housing 52 comprises an inner edge 54 and an outer edge 56. A split sock 50 may be applied about joint seal 12 after assembly of the drive axle shaft 14 and joint 16. Outer edge 56 is wrapped about joint seal 12 and around inner edge 54 to create a heat-resistant protective cover that is clamped about the drive axle shaft 14 and joint 16, as shown in FIG. 1. A suitable sealing means, such as staples 55 or an adhesive, are used to secure the edges 54, 56.

Split sock 50 is advantageous in that it is readily removable and replaceable about the joint seal 12. Further, where the sock is fabricated by the three-layer arrangement shown in FIG. 4, such fabrication will result in a seam along the profile of the sock, such as that shown in FIG. 3.

Where split sock 50 is formed of flexible heat-resistant material, sock 50 may be wrapped tightly about joint seal 12. Where seamless sock 10 is formed of flexible material, expanded central area 24 may be eliminated from the premolded sock 10 as the flexible material will readily flex with the axial and rotational movement of the joint seal 12.

Figure 5:
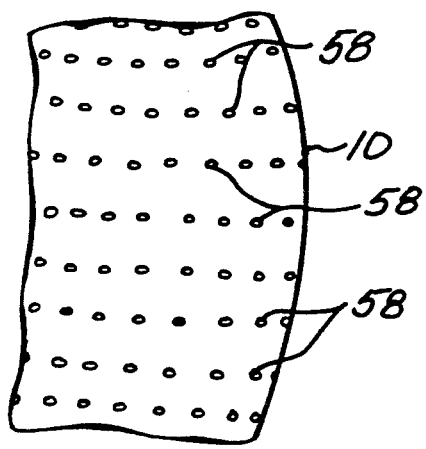
FIG. 5 is a cross-sectional view illustrating a third embodiment of the present invention.

With reference now to FIG. 5, a section of heat-resistant material is there shown having a plurality of perforations 58. These perforations are desirable to allow positive draining of the area between the joint seal 12 and the sock 10.

Figure 6:
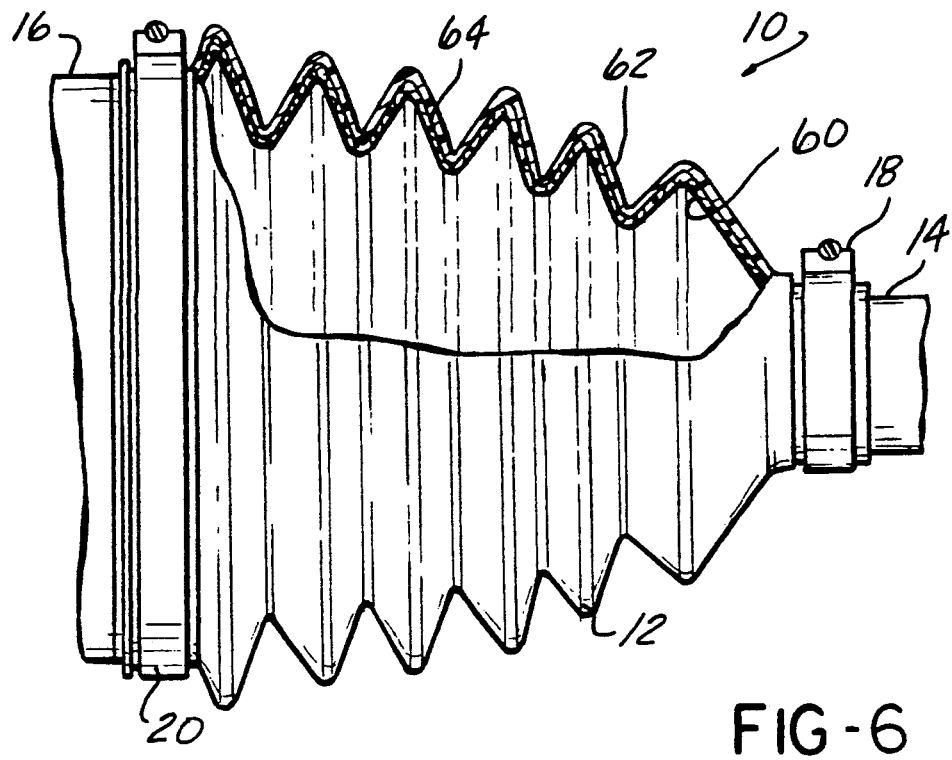
FIG. 6 is a partially sectioned view of a seal illustrating a fourth embodiment of the present invention.

With reference now to FIG. 6, a fourth preferred embodiment of the present invention is there shown at 10. A partially-sectioned view of drive axle joint seal 12 is there shown. In this preferred embodiment, a fabric liner 60 is surrounded by a thermoplastic elastomeric material 62 and blow-molded into the inner periphery of the drive axle joint seal 12. The fabric liner 60 and thermoplastic elastomeric material 62 are permanently bonded within and integral to the inner side wall 64 of the joint seal 12. The joint seal 12, with the inner sock 10, formed of the liner 60 and thermoplastic elastomeric material 62, are attached by clamping means 18, 20 about drive axle shaft 14 and joint 16, respectively.

Figure 7:
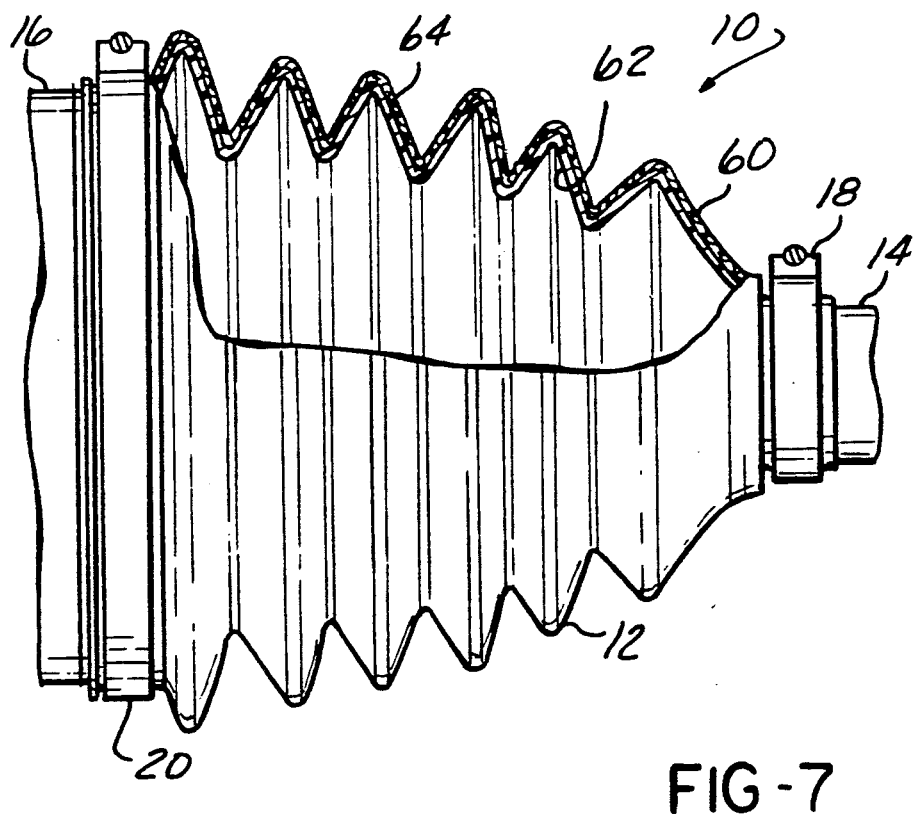
FIG. 7 is a view similar to FIG. 6 illustrating a fifth embodiment of the present invention.

With reference now to FIG. 7, a fifth preferred embodiment of the present invention is there shown illustrating a partial sectioned view of the seal 12. In this embodiment, a thermoplastic elastomeric material 62 is now surrounded by fabric liner 60 and blow-molded onto the outer periphery 64 of the drive axle joint seal 12. Blow-molding the thermoplastic elastomeric material 62 and fabric liner 60 onto the outer periphery of the drive axle joint seal 12 permanently bonds the material with the seal side wall 64. Seal 12, with the outer fabric layer, generally referred to at 10, is clamped in position by clamping means 18, 20 about drive axle shaft 14 and joint 16, respectively. The outer layer 10, as shown in FIGS. 6 and 7, is now bonded with the seal 12 forming a single integral unit. This newly formed sealed unit may aid in enhancing the heat-resistant and abrasion-resistant properties of the joint seal and increase the ultimate performance of the newly modified seal 12.

Socks, fabricated of different heat-resistant materials, may be used about different joint seal locations along the drive axle shaft. Different heat resistivity may be required where a joint seal is exposed to heat from a turbo engine or exhaust system, depending on the location of the drive axle shaft itself. Further, the heat-resistant material comprising the sock enhances and extends the range of operation of the joint seal by allowing the joint seal to be exposed to higher heat surroundings. A further advantage of the split sock is that it is removable and replaceable with the change in heat conductive conditions surrounding the joint seal.

Having described our invention, however, many modifications thereto will become apparent to those skilled in the art to which it pertains without deviation from the spirit of the invention as defined by the scope of the appended claims.

What is claimed is:

1. A heat-resistant sock for enclosing a mechanical joint connecting first and second elongated members, wherein said first and second members are moveable relative to one another and said joint is enclosed within an elongated boot connected at one end to the first member and connected at another end to the second member, the sock comprising:
   an elongated enclosure generally complementary to a shape of the boot and enclosing the boot, the enclosure having first and second surfaces defining apertures at first and second ends respectively engaging the first and second members, the enclosure having an outer insulating layer, a central fiber layer capable of withstanding exposure to temperatures up to 500° F. and an inner lubricating layer facing the boot; and
   releasable attaching means for clamping the first and second ends of the enclosure to the first and second members respectively.

2. The sock of claim 1 further comprising:
   the elongated enclosure formed of flexible fabric material loosely draped about the boot allowing unfettered normal movement of the first and second members relative to one another.

3. The sock of claim 1 further comprising:
   means defining an opening extending from the first end of the elongated enclosure longitudinally to the second end of the elongated enclosure allowing installation of the elongated enclosure over the boot in a radial direction with respect to the first and second members.

4. The sock of claim 1 further comprising:
   the releasable attaching means for clamping the first and second ends of the enclosure to the first and second members respectively spaced longitudinally from corresponding ends of the boot.

5. The sock of claim 1 further comprising:
   the elongated enclosure generally conforming to an exterior contour of the boot.

6. The sock of claim 1 further comprising:
   the outer insulating layer capable of reflecting heat away from the elongated enclosure.

7. A heat-resistant sock for enclosing a mechanical joint connecting first and second elongated members, wherein said first and second members are moveable relative to one another and said joint is enclosed within an elongated boot connected at one end to the first member and connected at another end to the second member, the sock comprising:
   an elongated enclosure formed of a flexible fabric material loosely draped about the boot allowing unfettered normal movement of the first and second members relative to one another, the elongated enclosure generally conforming to an exterior contour of the boot and generally complementary to a shape of the boot, the elongated enclosure enclosing the boot and having first and second surfaces defining apertures at first and second ends respectively engaging the first and second members, the elongated enclosure including means defining an opening extending from the first end of the elongated enclosure longitudinally to the second end of the elongated enclosure allowing installation of the elongated enclosure over the boot in a radial direction with respect to the first and second members, the elongated enclosure having an outer insulating layer capable of reflecting heat away from the elongated enclosure, a central fiber layer capable of withstanding exposure to temperatures up to 500° F. and an inner lubricating layer facing the boot; and
   releasable attaching means for clamping the first and second ends of the elongated enclosure to the first and second members respectively spaced longitudinally from corresponding ends of the boot.

* * * * *